United States Patent
Giannopoulos et al.

[11] Patent Number: 6,157,093
[45] Date of Patent: Dec. 5, 2000

[54] MODULAR MASTER-SLAVE POWER SUPPLY CONTROLLER

[75] Inventors: Demetri Giannopoulos, Norwalk, Conn.; Ihor Wacyk, Briarcliff Manor, N.Y.

[73] Assignee: Philips Electronics North America Corporation, New York, N.Y.

[21] Appl. No.: 09/406,648

[22] Filed: Sep. 27, 1999

[51] Int. Cl.[7] .................................................. H02J 1/00
[52] U.S. Cl. ................................ 307/38; 307/11; 307/31
[58] Field of Search .............................. 307/38, 11, 31; 315/307; 236/47; 340/10.02; 370/451; 710/64

[56] References Cited

U.S. PATENT DOCUMENTS

| | | | |
|---|---|---|---|
| 4,652,874 | 3/1987 | Loyer | 340/825.05 |
| 5,051,720 | 9/1991 | Kittirutsunetorn | 340/310 R |
| 5,471,119 | 11/1995 | Ranganath et al. | 315/307 |
| 5,697,048 | 12/1997 | Kimura | 455/6.3 |
| 5,839,654 | 11/1998 | Weber | 236/47 |
| 5,999,996 | 12/1999 | Dunn | 710/64 |

FOREIGN PATENT DOCUMENTS

| | | | |
|---|---|---|---|
| 0830982A2 | 7/1997 | European Pat. Off. | B60Q 1/076 |
| WO9839949 | 9/1998 | WIPO | H05B 41/36 |

*Primary Examiner*—Stephen W. Jackson
*Assistant Examiner*—Sharon Polk
*Attorney, Agent, or Firm*—Tony E. Piotrowski

[57] ABSTRACT

A master-slave programmable controller arrangement is disclosed for implementing control schemes in various control system topologies. The arrangement employs a modular design which allows a master unit to set operational modes for one or more instances of the same generic slave unit. The master unit and the slave unit communicate via a communications interface. Each slave unit is configured by the master unit to monitor/control one or more components or stages of, for example, a power supply.

16 Claims, 4 Drawing Sheets

MODULAR MASTER-SLAVE POWER SUPPLY CONTROLLER

FIELD OF THE INVENTION

The present invention pertains generally to the field of control systems. More particularly, the present invention relates to a modular master-slave implementation of a software programmable power supply controller.

BACKGROUND OF THE INVENTION

The use of ASIC's (Application specific Integrated Circuits) to implement the control of power supplies (e.g., a ballast) for lighting units is known in the art. ASIC's can perform the function(s) of a variety of discrete components on a single Integrated Component (IC). This is advantageous because the overall size of the power supply unit can be reduced. Also, in large volume applications, the cost of an ASIC is significantly less than the cost of discrete components that are required to perform the same function(s). This, in turn, reduces the overall cost and physical size of the power supply unit.

The ASIC's are typically designed to interface with specific components or stages in the power supply. The stages of the power supply may comprise one or more IC's and/or discrete elements. For example, FIG. 1 shows a power supply for a HID (High Intensity Discharge) lamp (not shown). The power supply 10 consists of three stages: a boost stage 11 for power factor correction, a down converter stage 12, and a full-bridge driver stage 13. The functions of these stages are well known in the art and are not described herein further. In this conventional device, three different ASIC's 14 are required to control the different stages of the power supply. Each of the ASIC's 14 are different and are designed to interface/control only with a particular stage.

Correspondingly, EPA 0 830 982 (Endo) shows a microcomputer and an ASIC being used to control a lighting circuit device for an automobile. This lighting circuit device may be used with multiple types of cars. Similar to the ASIC's 14, the ASIC used in the device of Endo is specifically designed for a particular hardware application. The ASIC, for example, can not be used to control another stage or hardware application of the lighting circuit device.

ASIC's may be either custom-made for the application or off-the-shelf components. Custom-made ASIC's are expensive and time-consuming to develop. Since the initial development cost for a custom-made ASIC may be high, they are typically only used in high volume applications, where the development costs can be spread-out in the price of all the units sold. In addition, a custom-made ASIC is typically designed to operate with a particular type of components/stages or a specific component/stage produced by a certain manufacturer. This prevents the ASIC's from being used with components/stages that perform the same type of function or components/stages from other manufacturers.

Off-the-shelf components typically require external components/hardware in order to use them in a specific application. The external components (e.g., other IC's and discrete electronic components) are necessary to interface the ASIC's to the particular stage. This, however, increases both the cost and size of the power supply. Another disadvantage is that when the off-the-self component is changed, the external components must be redesigned.

There thus exists in the art a need for a control system that takes advantage of all the benefits of ASIC's while allowing the same ASIC's to be used interchangeable with different system and power supply topologies.

BRIEF SUMMARY OF THE INVENTION

It is an object of the present invention to address the limitations of the conventional power supply controllers discussed above.

It is another object of the invention to provide a modular system controller having interchangeable generic components.

One aspect of the invention is directed to a circuit including a master integrated circuit having a controller and a master communication interface and at least one slave integrated circuit including an interface circuit and a slave communication interface. The interface circuit is capable of receiving signals from a component or stage of a control circuit and controlling the component or stage in accordance with the received signals. The slave IC is also capable of being programmed by the master IC through the communication interfaces to interface and control one or more different components or stages of the control circuit.

Another aspect of the invention is directed to a control system including a plurality of generic slave IC's that control one or more stages of a power control unit. A master IC is coupled to the plurality of generic slave IC's through a communication network to supervise operation of the plurality of generic slave IC's.

One embodiment of the invention relates to a system control apparatus including interchangeable means for monitoring and controlling one or more circuit portions of a system and control means for controlling the operation of the interchangeable means.

These and other embodiments and aspects of the present invention are exemplified in the following detailed disclosure.

BRIEF DESCRIPTION OF DRAWING

The features and advantages of the present invention can be understood by reference to the detailed description of the preferred embodiments set forth below taken with the drawings, in which.

DESCRIPTION OF THE PREFERRED EMBODIMENTS

In one aspect of the present invention, a master-slave approach is used to implement different control schemes in various power supply topologies using the same IC's or ASIC's. In this embodiment, a modular design approach of the invention employs a software programmable unit and multiple (interchangeable) instances of the same generic slave IC or ASIC. This modular approach simplifies the design of complicated power supply systems such as ballast controllers for HID or fluorescent lamps. Using the same IC's or ASIC's to control different power supply topologies also eliminates the need of developing new application-specific IC's (ASIC's), which, as described above, is both time-consuming and expensive. Also in contrast to using general-purpose, off-the-shelf IC's to implement a power supply controller which requires a significant number of external components, this modular approach requires few external components.

Figure 2:
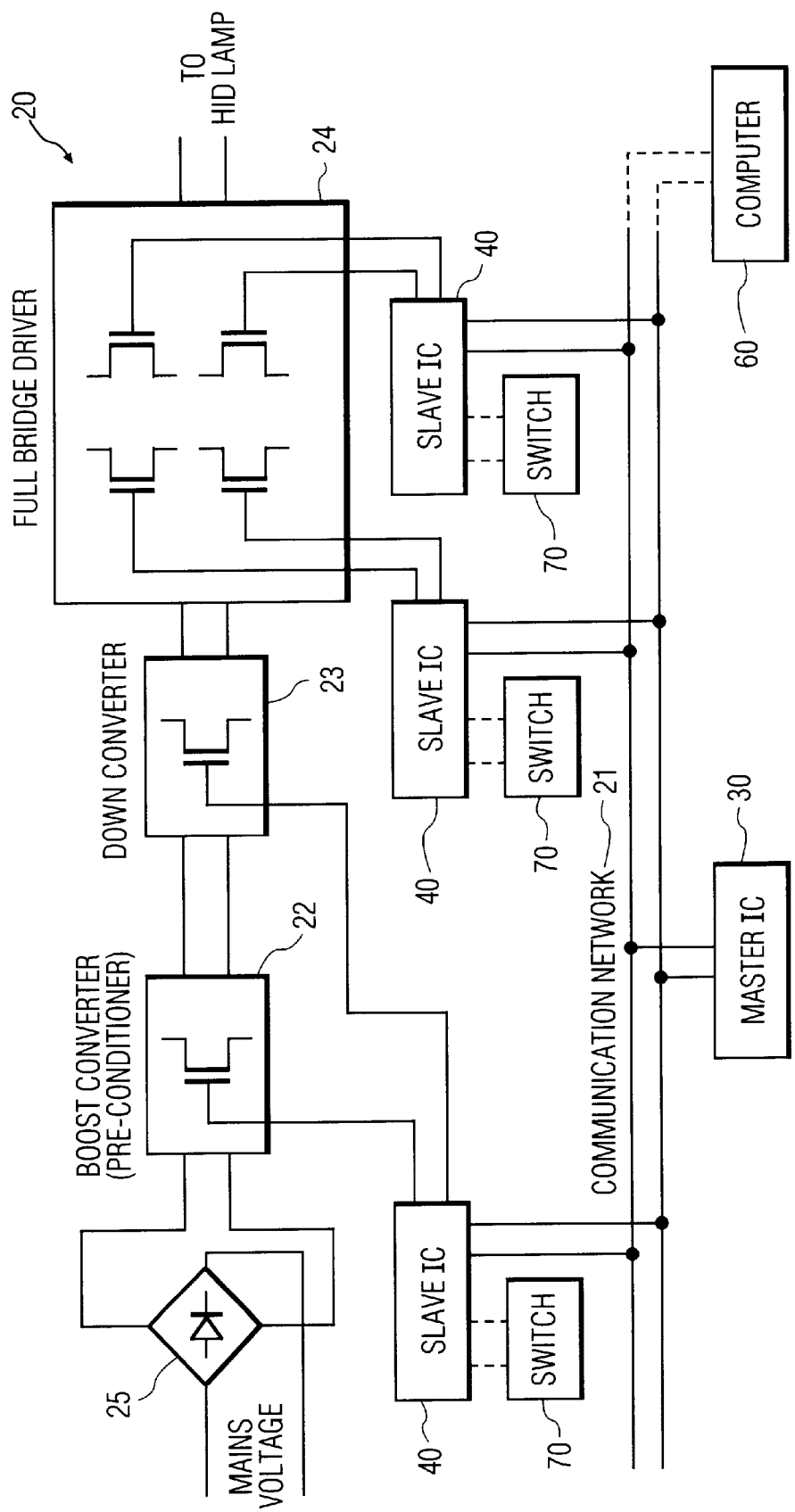
FIG. 2 is a schematic diagram of a power supply in accordance with one aspect of the invention.

In particular, referring to FIG. 2, a power supply 20 in accordance with the present invention is shown. The power supply 20 controls the power provided to a HID lamp (not shown). It should be understood that the present invention is not limited to this particular application, but can be implemented for other types of applications that require power supply controllers. Moreover, the invention may be used for other non-power related control system applications.

Figure 1:
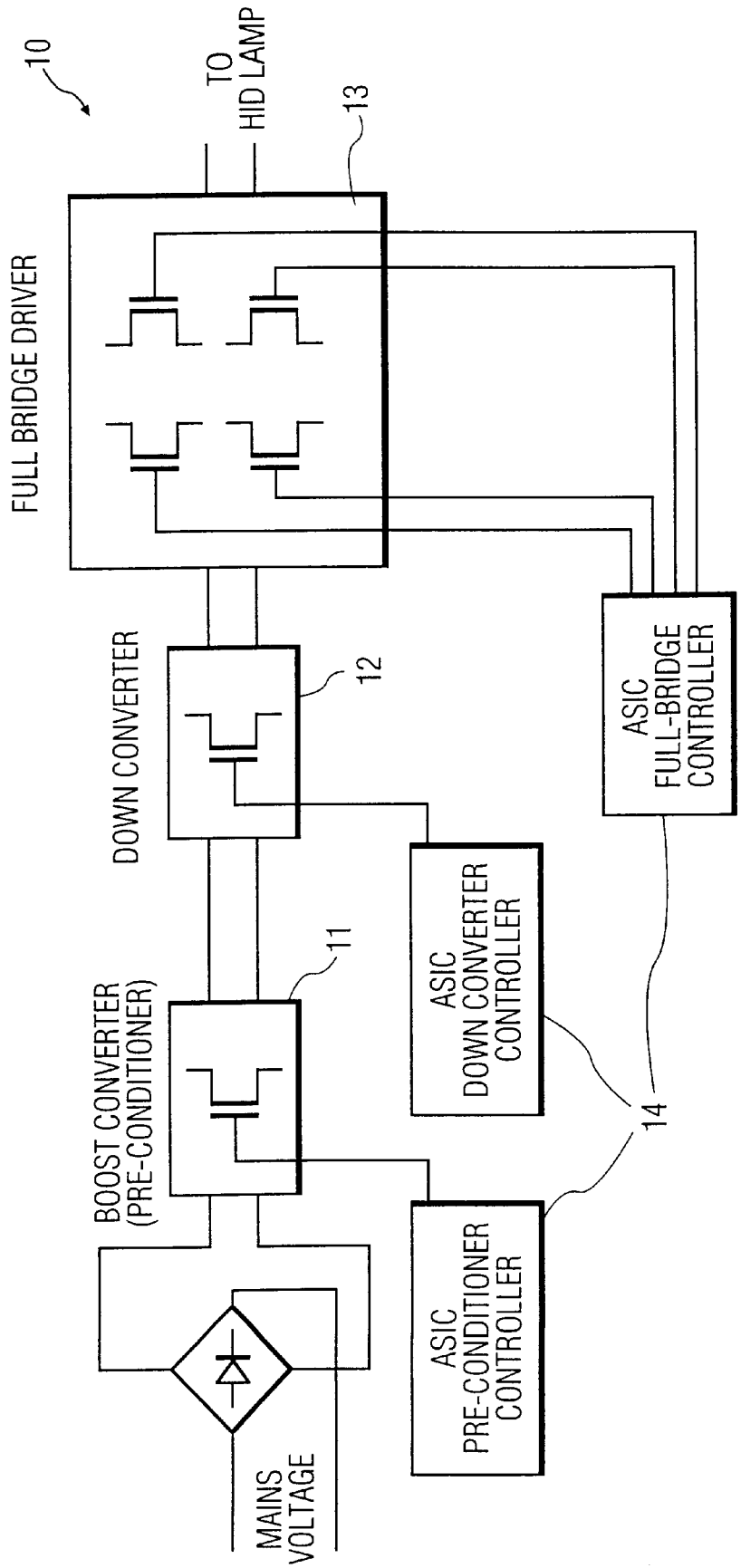
FIG. 1 is a schematic diagram of a power supply using conventional ASIC controllers.

In contrast to FIG. 1, which shows three different ASIC's for controlling the power supply 10, FIG. 2 show; the power supply 20 for the HID lamp using the master-slave approach. A master IC 30 is used to control a plurality of slave IC's 40. The master IC 30 may be an off-the-shelf micro-controller or an AS3IC. The slave IC's 40 are instances of the same slave IC that are used to control various stages of the power supply 20. The master IC 30 and the slave IC's 40 communicate via a communication network 21 (e.g., an inter-chip interface: I²C).

As shown in FIG. 2, the stages include a boost converter stage 22, a down converter stage 23 and a full bridge driver stage 24. Also shown in FIG. 2 is a rectifier stage 25. The master IC 30 and the slave IC's 40 perform all of the control functions needed to control the various stages of the power supply 20. Preferably, one slave IC 40 is used to control each stage of the power supply 20. However, one slave 40 may be used to control more than one component/stage of the power supply 20.

Figure 3:
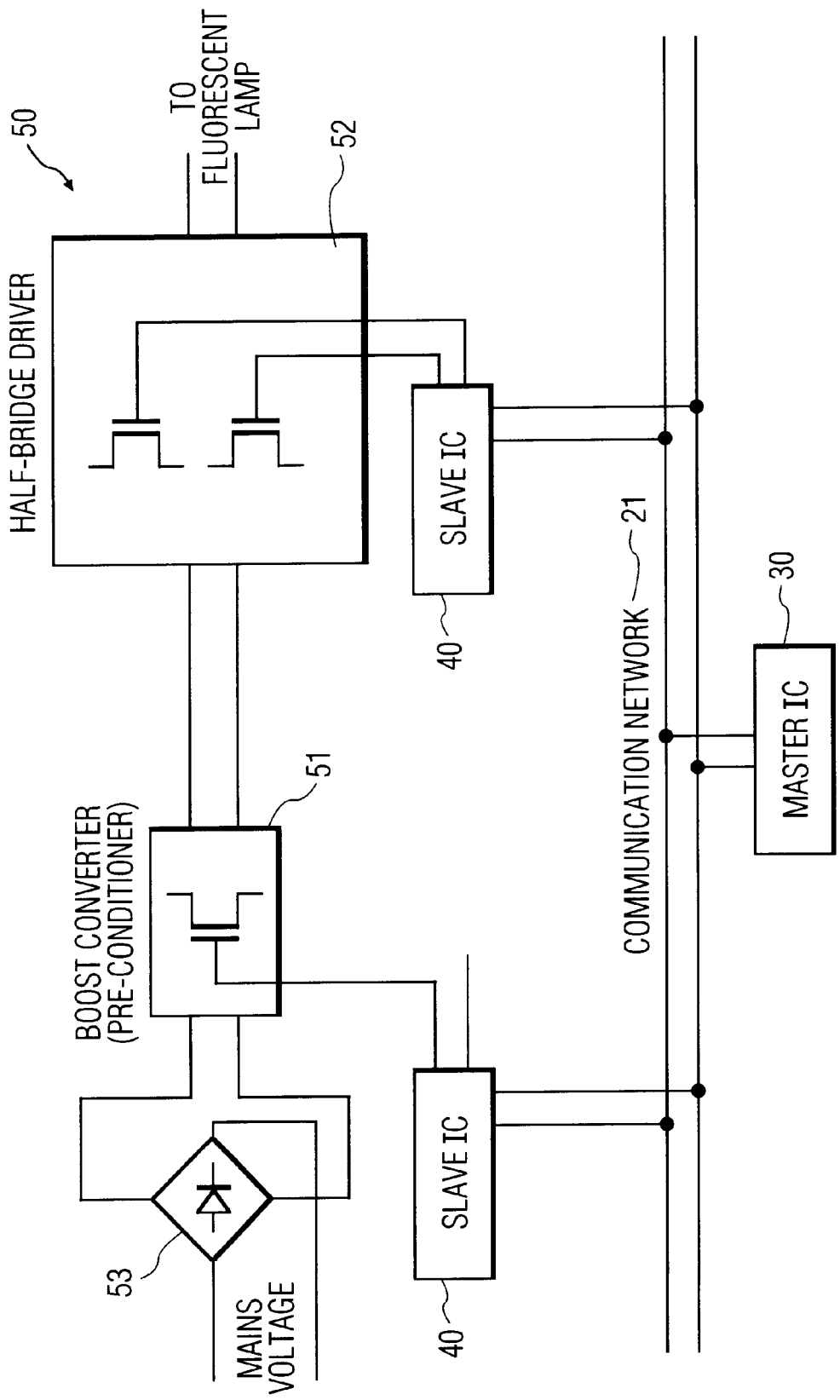
FIG. 3 is a schematic diagram of a power supply in accordance with another aspect of the invention.

As discussed above, the invention can be applied to other power supply topologies. For example, FIG. 3 shows a two-stage power supply 50 for a fluorescent lamp (not shown). The power supply 50 includes a boost converter stage 51, a half-bridge driver stage 52 and a rectifier stage 53. The same master IC 30 and slave IC's 40 (as shown in FIG. 2) are used to implement this power supply topology.

Figure 4:
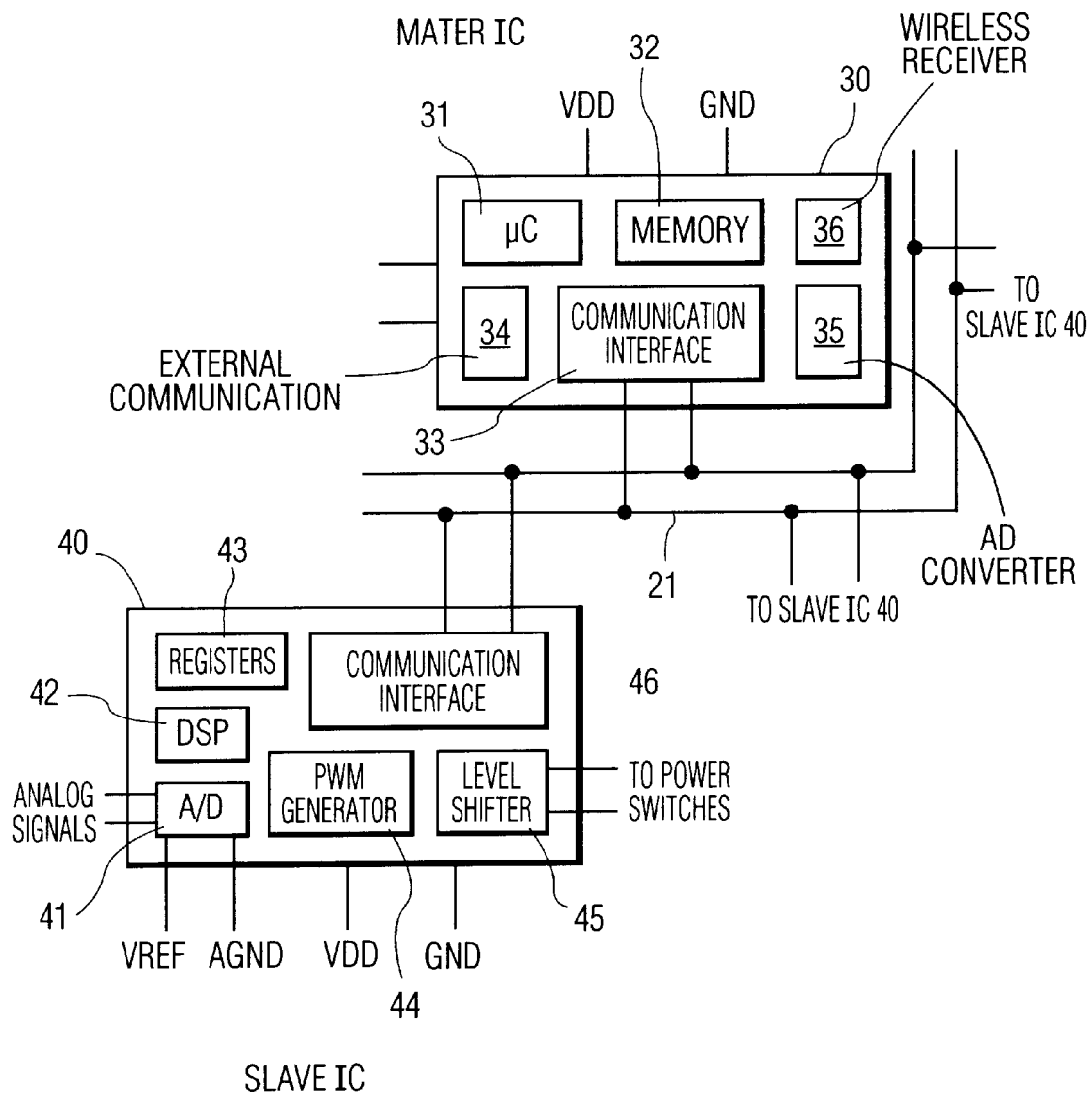
FIG. 4 is a schematic diagram of a power supply controller in accordance with a preferred embodiment of the invention.

As shown in FIG. 4, the master IC 30 preferably includes a micro-controller 31, a memory 32, and a communication interface 33. The master IC 30 may also include an external communication interface 34. The memory 32 stores instructions (e.g., computer-readable codes) that are executed by the micro-controller 31. In addition to executable instructions, the memory 32 may also store other data. Alternatively, the master IC 30 may be constructed by state-machine circuitry that performs one or more of the functions performed by the micro-controller 31.

Preferably, the communication interfaces 33 and/or 34 are two-way digital interfaces which may be serial or parallel. The communication interfaces 33 and/or 34 may include a hardwired connection such as a printed circuit (PC) board data bus arrangement. Alternatively, the communication interfaces 33 and/or 34 may include a wireless interface such as infrared or radio.

The master IC 30 executes the instructions, or proceeds through states, to control the slave IC's 40 via the communication interface 33. In particular, the master IC 30 sends commands and receives data from the slave IC's 40 via the communication interface 33. In addition, the master IC 30 supervises and coordinates the operation of the slave control IC's 40.

The control functions performed by the master IC 30 include: (1) threshold parameter setting in the slave IC's 40 (e.g., over-voltage threshold); (2) operation mode setting of the slave IC's 40 (e.g., continuous mode or discontinuous mode of boost converter); (3) setting the type of operations performed by the slave IC's 40; (4) timing parameter setting in slave IC's 40 (e.g., frequency of operation); (5) requesting and receiving status information from the slave IC's 40. The slave IC's 40 may also include registers to store operational/performance parameters or status information from the master IC 30.

The master IC 30 may include a library or database of predetermined modes or settings for the slave IC's 40. The library may be stored in the memory 32 or downloaded/updated via the external communication interface 34. The modes or settings may be selected via (1) a code input through an I/O port (e.g., toggle switches), (2) firmware stored in the memory 32, or (3) instructions provided through the external communication interface 34.

The external communication interface 34 is also used to communication with external data processing apparatus such a network/system controller or alarm/security system. For example, based on the status information from the slave IC's 40, the master IC 30 may communicate with a building security system to report an alarm or maintenance condition. For this embodiment, a master IC 30 with a battery power back-up may be used to ensure that if a building power failure occurs, the master IC 30 can still provide the alarm indication.

In another embodiment, the master IC 30 may employ a general-purpose (slow) A/D converter 35 (i.e., a monitor circuit) to monitor slow analog signals (e.g., from motion and/or light intensity sensors). These signals are then digitized and processed by the master IC 30. Control instructions are then sent to the slave IC's 40 via the communication interface 33.

In yet another embodiment, the master IC 30 includes a wireless receiver 36 (shown in FIG. 4). The wireless receiver 36 may, for example, function as an infrared (IR) detector so that the power supply 20 can be controlled using a handheld or wall mounted remote control unit. The wireless receiver 36 may also be use to monitor, or communication with, remote sensors (e.g., motion and/or light intensity sensors). Instructions based on the received signals from the remote control unit or sensors are then communicated to the slave IC's 40.

The slave IC's 40 are programmable computation engines that are capable of sensing analog (or digital) input signals and generating output signals to control the stages 22–24 of the power supply 20. The sensing and control is performed by interface circuitry. For example, signals from a component or stage are received by the interface circuitry and the output signals from the interface circuitry control and adjust the state of power switches (i.e., FET's) in the power supply 20. One or more slave IC's 40 can be used in an application.

Returning to FIG. 4, preferably, the slave IC 40 includes an A/D converter 41, a Digital Signal Processor 42, one or more registers 43, a Pulse Width Modulator (PWM) generator, a level shifter 45 and a communication interface 46. The A/D converter 41 receives analog signals from the various stages 22–24 of the power supply 20 (e.g., for over-sampling analog input signals). The Digital Signal Processor 42 processes digitized signals within the slave IC's 40. The register 43 is used for storing data to be transmitted or received via the communication interface 46. The PWM generator 44 is preferably a high resolution PWM generator for controlling the state of power switches within the power supply 20. The level shifter 45 drives the control inputs of the power switches.

The slave IC 40, however, is not limited to this architecture. Alternatively, or in addition, the slave IC 40 may include other types of monitoring circuits such as level latches or digital input circuitry.

As shown in FIG. 4, VREF is a reference voltage for the A/D converter 41. AGND is an analog ground reference. VDD is a supply voltage for powering the master IC 30 and the slave IC's 40. GND is the return ground.

All the slave IC's 40 use an identical interface (i.e., the communication interface 46) to communicate with the master IC 30. It should be understood that the communication interface 46 of the slave IC's 40 should match the type used for the communication interface 33 of the master IC 30. The master IC. 30 can communicate with all of the slave IC' 40 via a broadcast message or by individually addressing each slave IC 40.

In one embodiment, the slave IC's 40 may be programmed to operation in a predetermined mode (as discussed above) by setting the contents of the registers 43 via the communication interface 46. The predetermined modes include settings for each of the stages 22–24 of the power supply 20. The predetermined modes are determined based upon the specifications of, and/or types of signals to be monitored or received from, a particular stage. These predetermined modes are not necessarily mutually exclusive. In addition, other predetermined modes may be set based upon different criteria such as specific manufacturer's components.

As should be understood, the DSP 42 may also perform functions similar to a micro-controller. AccordiLngly, in another embodiment, the slave IC's 40 may be programmed via software or firmware instructions executed by the DSP 42. For example, the slave IC's 40 may collect data from a particular stage 22–24 so that the slave IC 40 (or the master IC 30) can analyze and determine which predetermined mode is most appropriate for the stage.

Moreover, in yet another embodiment, most or all of the processing/functions performed by the master IC 30 may be performed by the slave IC's 40 directly using, for example, the DSP 42. Predetermined modes or settings are input to the slave IC's 40 via the communication interface 46. The modes or settings may be sent from an external data processing apparatus (e.g., a (detachable) set-up computer 60 shown in FIG. 2) during manufacture or during installation on-site. The modes or settings may also be set by one or more switches 70, or the like, coupled to each slave IC 40. The computer 60 and/or the switches 70 are essentially a control means for controlling the operation/mode of each slave IC 40.

As discussed above, for different power management applications, a different number of generic slave IC's 40 are used. Designing a new or different ASIC for each stage or power supply is not needed. For example, if the boost converter stage 22 of the power supply 20 is to be changed because of an improvement in boost converter technology, the same slave IC 40 can be used to control the improved boost converter stage. In addition, the modular approach facilitates the design of even complex control systems from both an electrical design and physical design (i.e., the printed circuit broad) perspective. Thus, various types of stages can be easily assembled because the same generic slave IC's 40 can be used to control any of the stages.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. A power control circuit comprising:
   a master integrated circuit (IC) including a controller and a master communication interface; and
   at least one slave integrated circuit (IC) including an interface circuit and a slave communication interface, the interface circuit including an A/D converter, a digital signal processor and a PWM generator and being capable of receiving at least one signal from a component or stage of a control circuit and controlling the component or stage in accordance with the received signal,
   wherein the slave IC is capable of being programmed by the master IC through the communication interfaces to interface and control one or more different components or stages of the control circuit.

2. The circuit according to claim 1, wherein the power supply control circuit controls a lighting device.

3. The circuit according to claim 1, wherein the master communication interface and the slave communication are two-way digital interfaces.

4. The circuit according to claim 1, wherein the master IC further comprises an external communication interface.

5. The circuit according to claim 1, wherein the master communication interface and the slave communication are wireless interfaces.

6. The circuit according to claim 1, wherein the at least one slave IC is capable of being programmed in accordance with one or more predetermined modes.

7. The circuit according to claim 6, wherein the one or more predetermined modes are determined in accordance with a specification of the component or stage to be interfaced.

8. The circuit according to claim 1, wherein the slave IC is an application specific integrated circuit (ASIC).

9. The circuit according to claim 1, wherein the master IC and the slave IC are capable of being configured to control a plurality of different power control topologies.

10. The circuit according to claim 1, wherein the master IC further comprises a monitor circuit.

11. The circuit according to claim 1, wherein the master IC further comprises a wireless receiver.

12. The circuit according to claim 11, wherein the wireless receiver comprises an infrared receiver.

13. A control system comprising:
    a plurality of slave integrated circuits (IC's) each arranged to control one or more stages of a power supply; and
    a master integrated circuit (IC) coupled to the plurality of slave IC's through a communication network arranged to supervise operation of the plurality of slave IC's,
    wherein the plurality of slave IC's are interchangeable with each other.

14. A control apparatus for a power supply comprising:
    interchangeable means for controlling one or more circuit portions of the power supply; and
    setting means for setting a predetermined mode of operation of said interchangeable means,
    wherein the power supply includes a boost converter circuit portion, a down converter circuit portion and a bridge driver circuit portion.

15. The apparatus according to claim 14, wherein the power supply is capable of providing power to a high intensity discharge or fluorescent lamp.

16. The apparatus according to claim 14, wherein the interchangeable means being capable of monitoring and controlling a plurality of power supply topologies.

* * * * *